(No Model.)  5 Sheets—Sheet 1.

W. BOWKER.
MACHINE FOR SAWING BARREL HOOPS FROM POLES.

No. 257,918. Patented May 16, 1882.

Witnesses.
S. N. Piper
E. B. Pratt

Inventor.
Wm. Bowker
by R. H. Eddy, atty.

(No Model.)  5 Sheets—Sheet 2.
W. BOWKER.
MACHINE FOR SAWING BARREL HOOPS FROM POLES.
No. 257,918. Patented May 16, 1882.

Witnesses.
S. N. Piper
E. B. Pratt

Inventor
Wm. Bowker.
by R. H. Eddy atty.

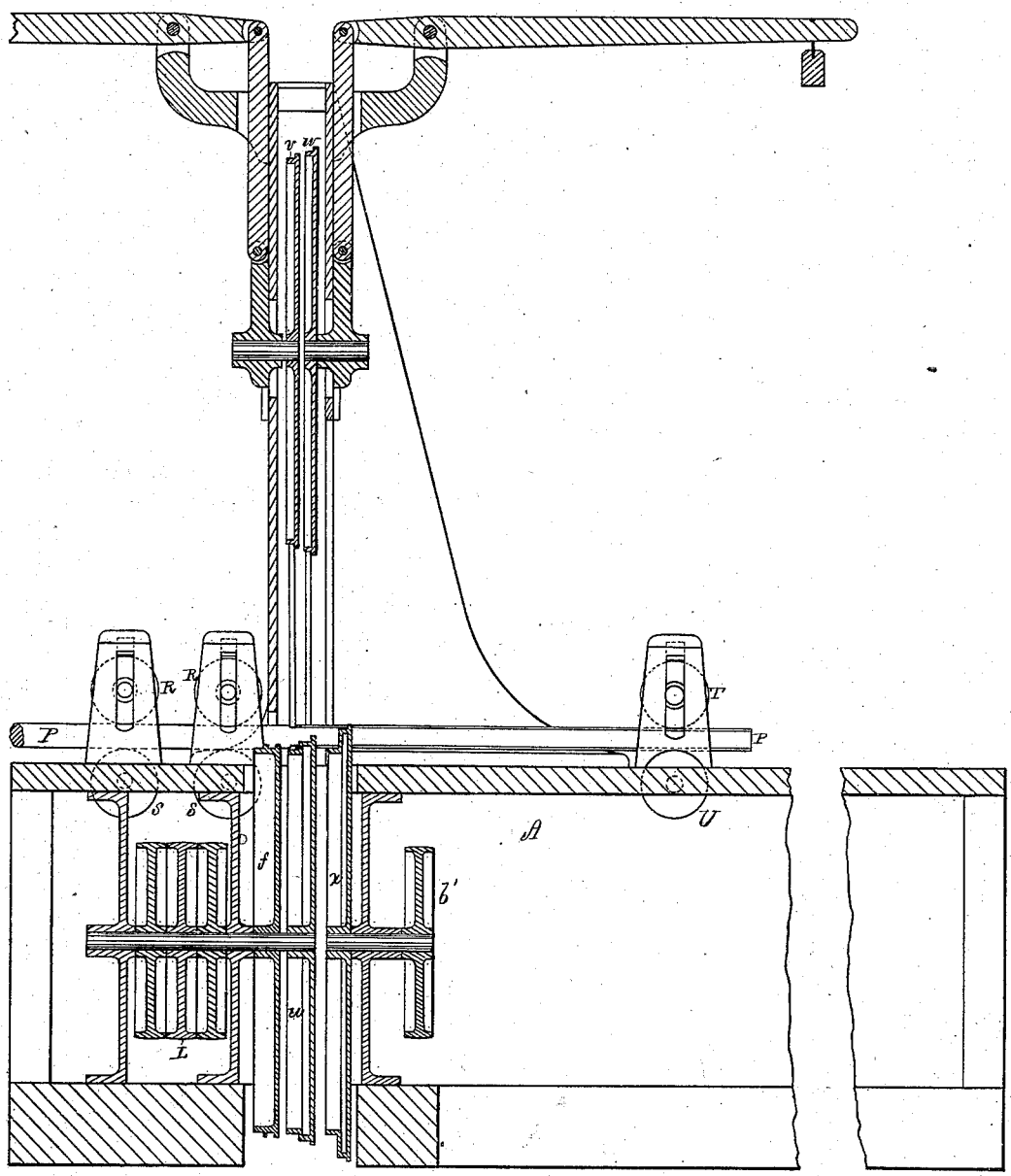

(No Model.) 5 Sheets—Sheet 4.
W. BOWKER.
MACHINE FOR SAWING BARREL HOOPS FROM POLES.
No. 257,918. Patented May 16, 1882.
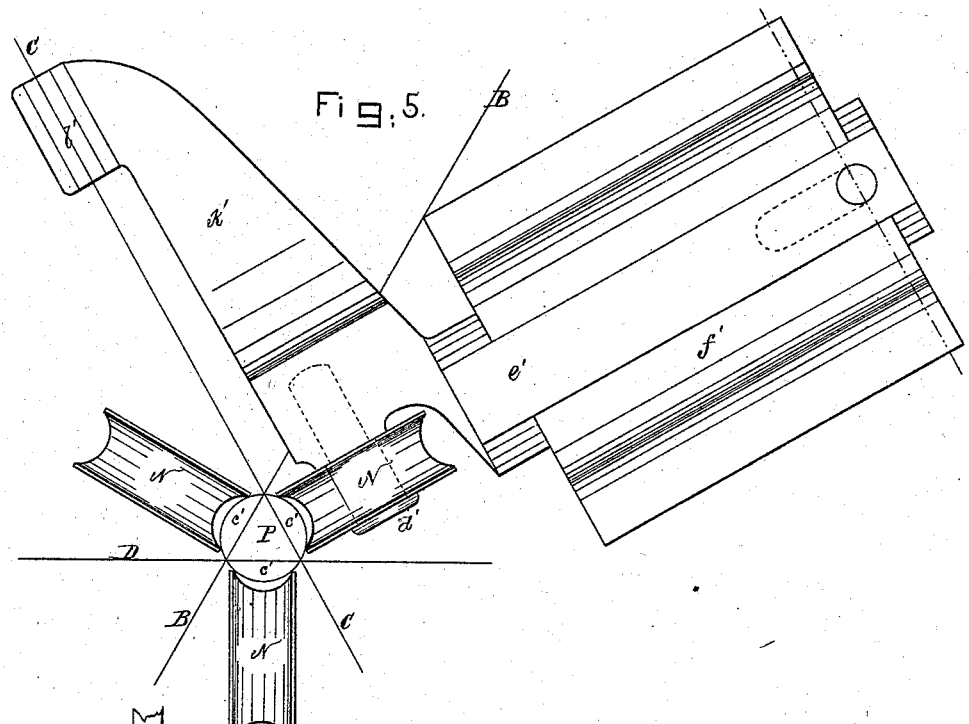
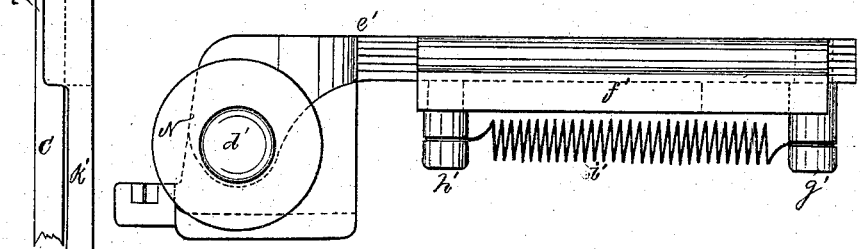
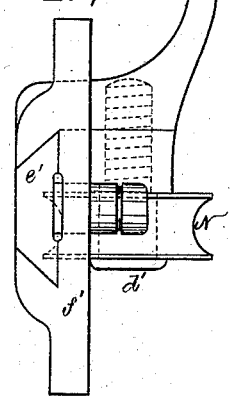
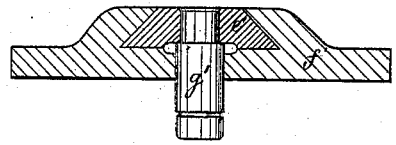
Witnesses.
Inventor.
Wm. Bowker.
by R. H. Eddy att'y.

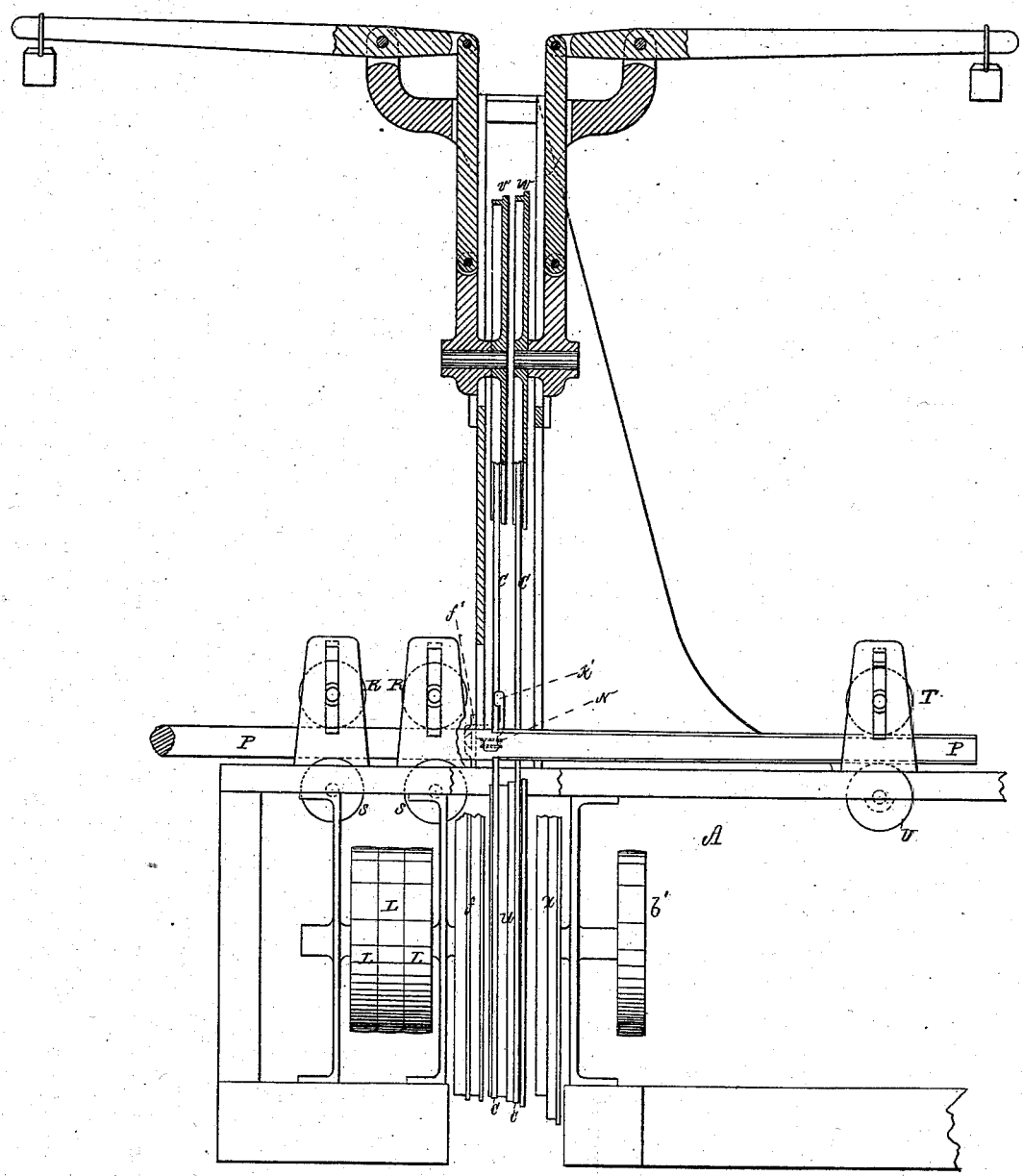

UNITED STATES PATENT OFFICE.

WILLIAM BOWKER, OF SOMERVILLE, ASSIGNOR TO HIMSELF AND ROBERT WILLIAMS, OF BOSTON, MASSACHUSETTS.

MACHINE FOR SAWING BARREL-HOOPS FROM POLES.

SPECIFICATION forming part of Letters Patent No. 257,918, dated May 16, 1882.

Application filed January 23, 1882. (No model.)

*To all whom it may concern:*

Be it known that I, WILLIAM BOWKER, a subject of the Queen of Great Britain, and a resident of Somerville, of the county of Middlesex, of the State of Massachusetts, have invented a new and useful Improvement in Machinery for Sawing Barrel-Hoops from Poles; and I do hereby declare the same to be described in the following specification and represented in the accompanying drawings, of which—

Figure 1:
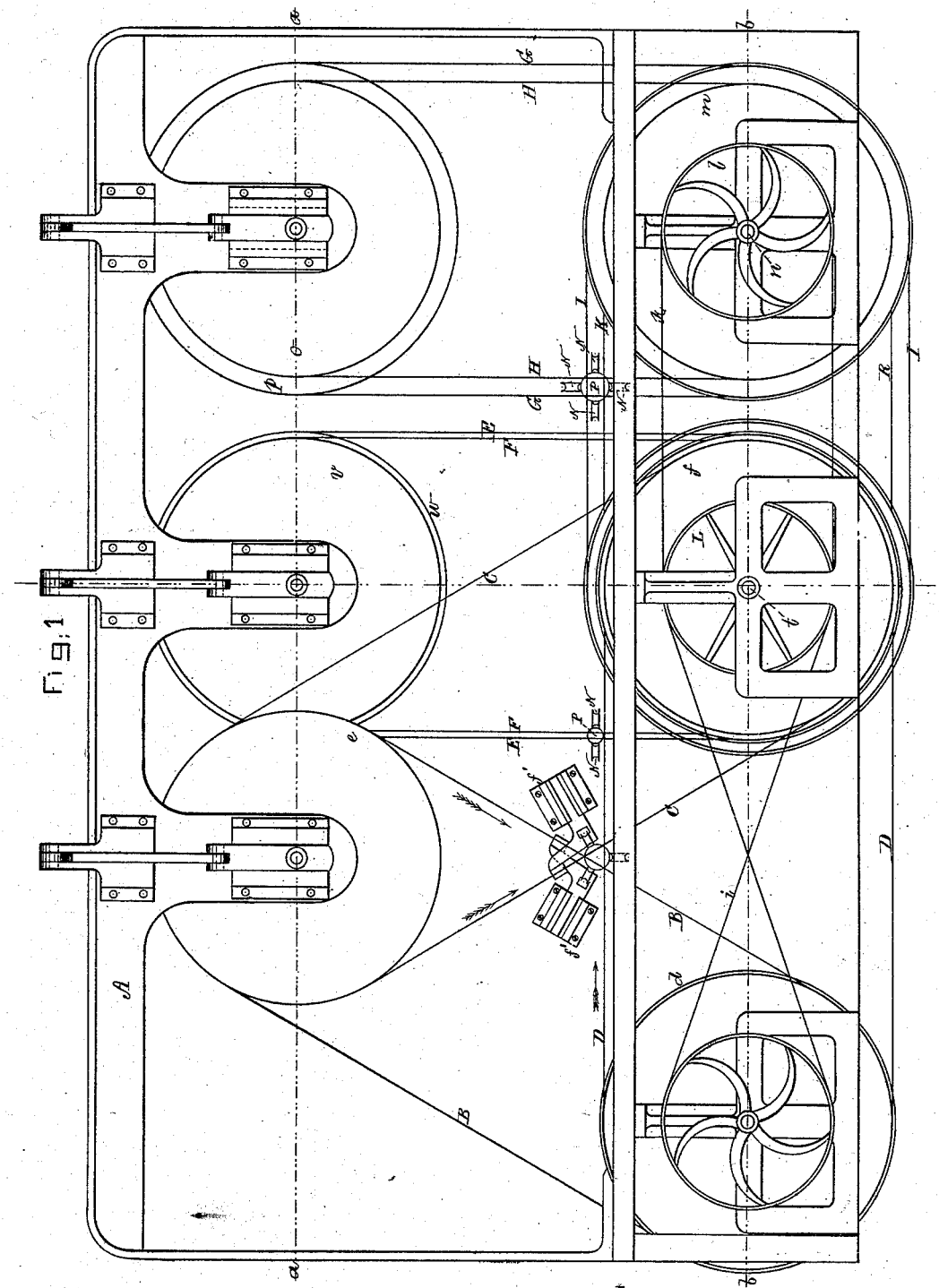
Figure 2:
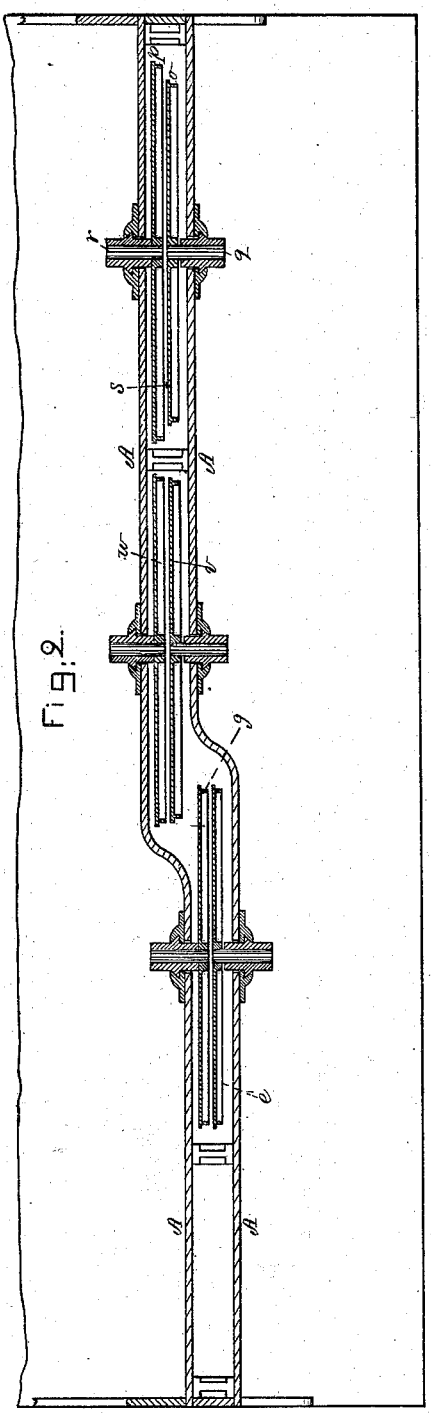
Figure 3:
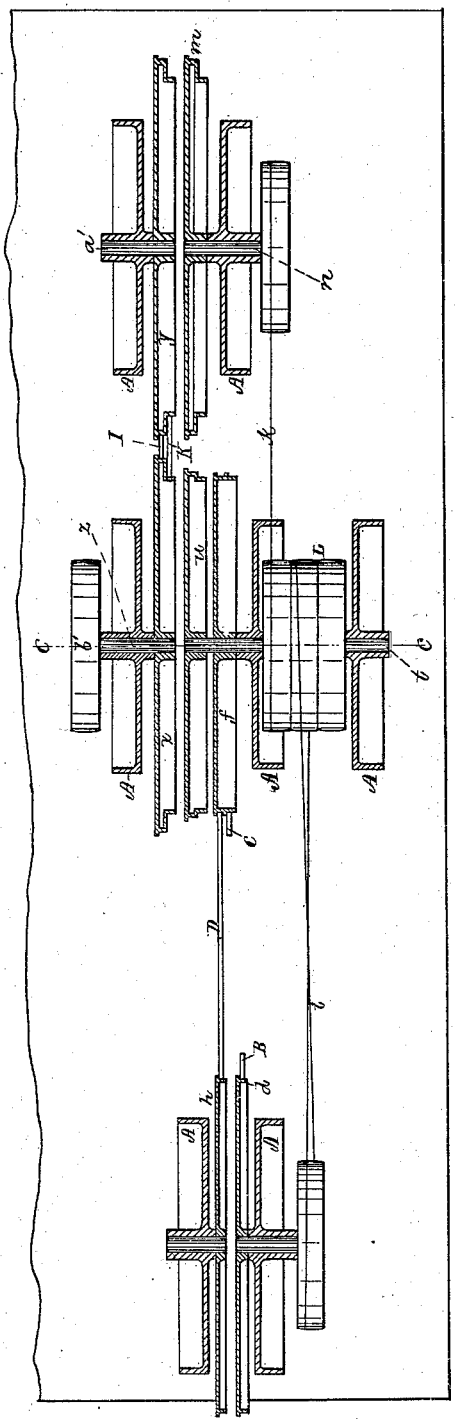

Figure 1 is a front elevation of a machine embodying my invention. Fig. 2 is a horizontal section of it, taken on line $a\ a$ of Fig. 1. Fig. 3 is a horizontal section of it, taken on line $b\ b$ of Fig. 1. Figs. 4 and 9 are vertical and transverse sections of it, taken on line $c\ c$ of Fig. 3. Fig. 5 is a front elevation, Fig. 6 a side view, and Fig. 7 a rear view, of one of the automatically-adjustable saw-guides and friction-rollers to be described. Fig. 8 is a transverse section of the supports of the said guide and roller.

The nature of the invention is set forth in the claims hereinafter presented.

The machine is for sawing, by means of two or more endless band-saws, hoops from a pole. The drawings show in one case two saws, in another three, and in a third four saws, arranged to sever hoops from a single pole.

In such drawings, A denotes the frame for sustaining the operative mechanism.

B, C, and D are the set of three saws for operating on a pole for removing three hoops at once from it.

E and F are the set for simultaneously separating from a pole two hoops in case such hoop-pole may not be of sufficient diameter for more than two hoops.

G, H, I, and K are a set of four saws for operating on a pole for simultaneously separating from it four hoops.

The saw B is supported and runs on two wheels or pulleys, $d\ e$, arranged as shown in Figs. 1, 2, and 3. The wheels for sustaining the saw C are shown at $f$ and $g$, and those for supporting the saw D at $h$ and $f$, from which it will be seen that one wheel or pulley, $f$, carries two of the saws—viz., those marked C and D.

The driving-pulley for operating the saws is shown at L as carrying a covered endless belt, $i$, and an uncovered endless belt, $k$, the latter belt serving to drive a pulley, $l$, on whose arbor $n$ is fixed a duplex pulley, $m$, on and partly about which are the two band-saws G and H. These saws are further supported by two wheels, $o$ and $p$, which are sustained by separate arbors $q$ and $r$, (see Fig. 2,) arranged with their axes in or about in the same straight line, but with a space, $s$, between them and also between the said wheels $o$ and $p$. This space should be a little wider than the saw G. The object of having the two separate arbors with the space $s$ between them and their wheels is to enable the saw G to be readily removed from or applied to such wheel, as occasion may require, without the necessity of first removing the saw H from its supporting wheels or pulleys. A further object of having the separate axles to the wheels is to admit of either wheel being moved upward or downward independently of the other, in order to tighten or slacken its saw independently of the other saw, as occasion may require.

The driving-pulley L is fixed on a shaft, $t$, which carries a duplex wheel, $f$, that supports the two saws C and D. This shaft $t$ also carries another duplex wheel, $u$, (see Fig. 3,) about and on which and two other wheels, $v\ w$, (see Figs. 1 and 2,) the two saws E and F are arranged. The wheels $v\ w$ are revolved on separate axles, and there is a space between such wheels and also between such axles, such space being of a width to admit of the saw E being removed from or applied to the wheel $w$ without first having to remove the saw F from the wheel $v$.

The saws I and K are supported by two duplex wheels, $x$ and $y$, (see Fig. 3,) fixed on separate shafts $z$ and $a'$, arranged as shown. There is secured on the shaft $z$ a driving-pulley, $b'$, which, when revolved, turns the shaft $z$ and pulley $x$ and moves the saws I K, their sustaining-pulley $y$ turning loosely on its arbor.

In the drawings the pole to be sawed is shown at P, its arrangement with respect to each set of saws being represented in Fig. 1. In Fig. 5 the hoops or sections to be separated from the pole are marked $c'$, each of which is supported against one of three rollers, N. Each of such rollers is grooved on its periphery, as shown, and revolves freely on a journal, $d'$, projecting from a slide, $e'$, supported by and so as to be capable of sliding rectilinearly in a stationary guide, $f'$.

To studs $g'$ $h'$ projecting from the slide $e'$ and guide $f'$, as shown in Fig. 6, a spiral spring, $i'$, is fixed. This spring serves to move the slide so as to cause the roller N to bear on the hoop-pole $c'$ next to it. The curve of transverse section of the groove of the roller has a radius less than that of the pole, in order that any small knot or projection on the pole-section may pass the roller without forcing it off the pole. Besides the roller, each of the slides $e'$ has an arm, $k'$, extended from it, as shown, such arm being grooved at $l'$ to receive, support, and guide the saw C. Each of the saws is to be provided with a like sustaining and guiding arm and a supporting-slide, $e'$, thereof, and such slide should carry a roller, N. As the pole may vary in diameter the pressure-rollers, with the saw-guides, will be moved in correspondence therewith while the pole may be passing between such rollers, the saws being thus guided and moved so as to cut from the pole hoops uniform in transverse section.

R R and S S, Fig. 4, are two sets of rollers for feeding the pole P to the saws, while T and U are a set of draw-rollers for receiving and guiding and drawing forward the heart or portion of the pole from which the hoops may have been separated by the saws. The upper of each set of the said rollers is to be supposed to have suitable mechanism for revolving it.

In the operation of this machine the hoop-pole is first to be passed endwise between the first set of feed-rollers, R S, which seize it and force it between the second set, which in turn seize it and drive it forward to the saws, which, revolving, separate from it the hoops, the pole portion between such hoops passing between the draw-rollers T U, which sustain and advance it, the hoops passing off aside of those rollers without going between them.

What I claim as my invention is as follows, viz:

1. The combination of two or more endless band-saws with a guide, $k'$, and a pressure-roller, N, located at and adapted to hold the work to each of such saws, substantially as set forth.

2. The combination of one or more sets of feed-rollers and a set of draft-rollers with two or more endless band-saws and a guide and pressure roller located at and adapted to hold the work to each of such saws, substantially as set forth.

3. Two next contiguous band-saws supporting pulleys provided with separate arbors, arranged in or about in line with each other, and having between them, and also between the two pulleys, a space, $s$, as described, a little wider than the band-saw to run on one of such pulleys, all being substantially as shown and specified, and for the purpose set forth.

4. The three endless band-saws B C D and their pulleys $d$, $e$, $f$, $g$, and $h$, the latter arranged in pairs, as shown, the pulley $f$ supporting the two saws C and D, the whole combined and arranged for simultaneously making three cuts in the pole, as set forth and described.

WILLIAM BOWKER.

Witnesses:
R. H. EDDY,
E. B. PRATT.